(12) United States Patent
Engelhardt

(10) Patent No.: US 8,460,775 B2
(45) Date of Patent: Jun. 11, 2013

(54) FLOOR MAT IMPROVEMENT

(76) Inventor: Bernard Engelhardt, Maple (CA)

(\*) Notice: Subject to any disclaimer, the term of this patent is extended or adjusted under 35 U.S.C. 154(b) by 347 days.

(21) Appl. No.: 12/767,951

(22) Filed: Apr. 27, 2010

(65) Prior Publication Data

US 2010/0272944 A1    Oct. 28, 2010

Related U.S. Application Data

(60) Provisional application No. 61/214,726, filed on Apr. 28, 2009, provisional application No. 61/217,828, filed on Jun. 5, 2009.

(51) Int. Cl.
*B32B 3/02* (2006.01)
*B32B 3/10* (2006.01)
*B32B 11/00* (2006.01)

(52) U.S. Cl.
USPC ............ 428/68; 428/78; 428/119; 428/120; 15/215

(58) Field of Classification Search
USPC ..................................... 428/68, 78
See application file for complete search history.

(56) References Cited

U.S. PATENT DOCUMENTS 5,725,926 A * 3/1998 Wang .............................. 428/78
2006/0099387 A1 * 5/2006 Parkes et al. ................. 428/156

\* cited by examiner

*Primary Examiner* — Brent O'Hern

(57) ABSTRACT

An improved apparent surface (Astroturf like) material surrounded by a water tight enclosure with raised borders that better control and conceal any debris and dirt that is scraped off the shoes or otherwise fall onto the mat. Means are provided to direct the debris to an area where it is better concealed from view and more protected from any blowing air. The debris is less likely to be blown about by any stream of air, such as a heater fan. In one configuration the debris is substantially completely sealed.

16 Claims, 13 Drawing Sheets

FLOOR MAT IMPROVEMENT

CROSS-REFERENCE TO RELATED APPLICATIONS

This application claims the benefit of provisional patent application Ser. 61/214,726 filed 2009 Apr. 28 by the present inventor.

This application claims the benefit of provisional patent application Ser. 61/217,828 filed 2009 Jun. 5 by the present inventor.

FEDERALLY SPONSORED RESEARCH OR DEVELOPMENT

Not Applicable

NAMES OF PARTIES TO A JOINT RESEARCH AGREEMENT

Not Applicable

INCORPORATION-BY-REFERENCE OF MATERIAL SUBMITTED ON A COMPACT DISC

Not applicable

BACKGROUND OF INVENTION

1. Field of Invention

This invention relates to floor mats in general, but most specifically those used in cars, trucks, and other human operated equipment where vehicle appearance and protection, personal appearance and protection, and air quality within the vehicle are all of concern.

2. Description of Related Art

Upon entering a vehicle, depending on location and weather conditions, it is normal to track into the vehicle, the following undesired elements (undesirables); water, snow, ice, earth, grass, pollen, gravel, sand, animal excrement, and anything else one has had the misfortune to step on or into. To protect the vehicle's original floor mat covering from these undesirables, a variety of accessory floor mats are currently on the market. These floor mats are typically made of a carpet material, similar to the material used in the vehicle's original floor mating, or a waterproof elastomeric material, more suited for inclement weather conditions. Such waterproof elastomeric mats are commonly known as All Weather mats, and typically have numerous indentations and wells for collecting dirt and water. While these standard floor mat mats are effective at protecting the original floor mat covering of the vehicle, there are adverse effects, caused by the introduction of the undesired elements, for which the standard floor mats do not protect against.

One such adverse effect, common among carpeted floor mats, is the diminished appearance of the floor mat once these undesirables are introduced. The simple presence of the undesirables is unsightly, requiring the floor mat to be vacuumed on a regular basis. Even when vacuumed, the undesirables often leave stains, requiring the floor mat to be washed. Even when washed, the abrasive nature of some of the undesirables causes wear on the floor mat and eventually the floor mat must be replaced. In most cases the first area to wear out is the heel pad area, generally as a result of the accumulated debris being ground into the mat by the back of the driver's shoe as he operates the accelerator and brake pedals.

Another adverse effect is salt damage and this commonly occurs during protracted inclement weather such as snow. Salt, used to keep roads from freezing, along with excess snow and ice, are tracked onto the floor mat and quickly result in a salt water solution. This solution not only has the potential to spill onto the car floor mat, later causing rust, it is also often absorbed by the heel of the occupant's shoe and lower pant leg, causing salt stains and damage upon drying.

There are a number of prior art patents which have proposed solutions to this problem and which show various means for collecting and/or draining off the water and snow melt, none of which proposed solutions are considered completely satisfactory. Examples of the patented devices are shown in: U.S. Pat. Nos. 2,650,855 to Peirce; 3,149,875 to Stata; 3,284,836 to Ioppolo; 4,211,447 to DiVincenzo; 4,280,729 to Morawski and 4,420,180 to Dupont.

Yet another adverse effect not covered by the prior art, is the pollution of cabin air caused by the introduction of the undesirables. Once tracked into the vehicle, the undesirables are then deposited on the floor mat and further ground down by the action of one's feet on the mat. This grinding down phenomenon creates a fine dust and particle mixture of the undesired material. The heater, air conditioner, or ventilation fan blows down upon the surface of the mat, which introduces the undesired and potentially unhealthy, dust and debris mixture into the vehicle's cabin air. Compounding this problem is the fact that each year, as cars get smaller and lower, the interior space of the cabin gets smaller. This has two consequences that cause the degree of air pollution to increase exponentially. The first consequence is that the volume of cabin air decreases, yet the amount of introduced undesirables remain the same. The second consequence of the smaller and lower cars, is that the distance from the fan to floor mat, along with the distance from the floor mat to the occupants, are both significantly reduced.

BRIEF SUMMARY OF THE INVENTION

Vehicle Mat Embodiment

In accordance with one embodiment, a floor mat system utilizing floor mat with a top surface created by a multitude of projections or blades, a predetermined hole pattern in the bottom surface, and a multi planar surface on the mat bottom surface that directs substantially all the debris that has fallen down through the blades into the holes and down into a tray with raised edges. The tray (waterproof sealed base with raised edges), into which the mat is inserted has depressions that match the hole pattern of the mat. This allows for a greater amount of debris to accumulate as well as for better protection for the accumulated debris. Provision is made for the mat to move the precise distance, relative to the tray to seal all the depressions and further protect the accumulated debris. In one embodiment that describes the mat system for use in a vehicle, provision is also made for a replaceable heel pad as well as a carpeted mat with the same shape and locking features of the floor mat so as to be interchangeable with the floor mat when an all carpet appearance is preferred.

Entrance Mat Embodiment

The aforementioned problems also exist with entrance mats, more specifically, large entrance mats typically found in large commercial buildings. The basic floor mat as described herein provides the best scraping mat available and has been very successfully marketed as such for many years by the manufacturers of a similar product (Solutia). However, due to its very nature, it is very difficult to vacuum since the hose can never be brought close to the bottom. In ordinary household mats, this is overcome by merely turning the mat upside down. In large entrance mats, especially like those in office building entrances, this is not the case.

BRIEF DESCRIPTION OF THE SEVERAL VIEWS OF THE DRAWINGS

Several embodiments of the present invention will be provided, by way of examples only, with reference to the appended drawings, wherein:

FIG. 5A shows the Enhanced Floor mat inside the waterproof tray with the cam set in the open position, in accordance with the Second Embodiment

DRAWINGS

Reference Numerals

Figure 1A:
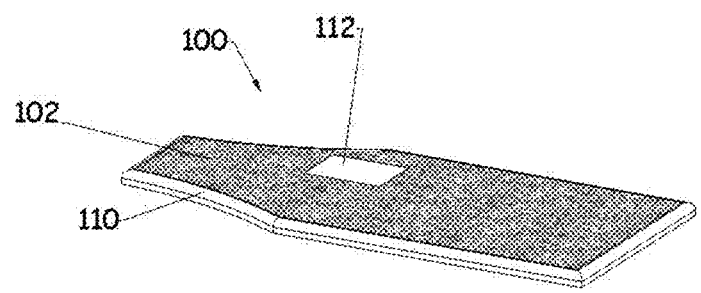
FIG. 1A shows the completed assembly in accordance with one embodiment of the vehicle floor mat, herein called the First Embodiment.

100—First Embodiment
102—Floor mat
104—Hole pattern in Floor mat
106—Floor mat projections (blades)
106 A top surface of projections
108—Waterproof Lining (welded to Floor mat)
108A underside of Floor mat
110—Raised plastic rubber border
110A—Floor mat perimeter
112—Heel pad
112 A top surface of heel pad
112 B underside of heel pad
114—Cut out section for Heel Pad in Floor mat
200—Second Embodiment
202—Waterproof tray
202A—Bottom surface of waterproof tray
202B—Inside perimeter of tray
204—Ribs for collecting and sealing undesirables
204A—Top surface of ribs
206—Water Drainage Slots
208—Water collection area
208A—Water collection area ribs
208B—Water drainage slots in ribs
210—Cam
210A—Open position of cam
210B—Closed position of cam
212—Cam Compartment
214—Cover plate
214A—Screw holes in cover plate
214B—Screw posts for cover plate in tray
216—Sponge
218—Enhanced Floor mat
220—Multi-planar bottom surface
222—Cam follower
224—Heel pad plate
224A—Locking lever
224B—Locking channel in waterproof tray
226—Section in tray for heel pad/heel plate assembly
302—Waterproof tray with vertical ribs
304—Vertical ribs
306—Side mounted cam 308—Water collection area
400—Third Embodiment
402—Waterproof tray (no ribs)
404—Moveable plastic sheeting
406—Enhanced Floor mat with ribs molded to the underside
408—Ribs on the underside of the Floor mat
410—Water collection area
500—OEM Embodiment
502—OEM waterproof tray
504—Vertical Edges
506—Lip on top surface
508—Recess cut out from carpet floor mat
510—OEM Vehicle Type Carpet Floor Mat
602—Waterproof tray—Commercial Entrance Mat Embodiment
604—Ribs on the top surface of the tray

DETAILED DESCRIPTION OF THE INVENTION

First Embodiment

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical, mechanical or electrical connections or couplings. Furthermore, and as described in subsequent paragraphs, the specific mechanical and/or electrical, other configurations illustrated in the drawings are intended to exemplify embodiments of the invention. However, other alternative mechanical and/or electrical or other configurations are possible which are considered to be within the teachings of the instant disclosure.

Figure 1B:
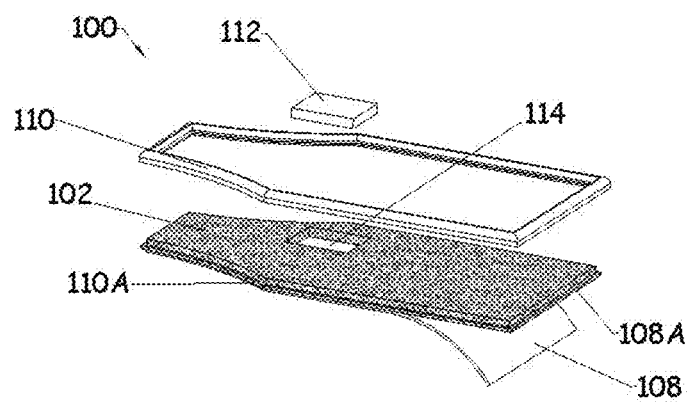
FIG. 1B shows the exploded view of the First Embodiment assembly; an Floor mat, a waterproof lining welded to the underside of said Floor mat, a plastic rubber border either welded or sewn to said Floor mat, and a carpet heel pad.
Figure 1C:
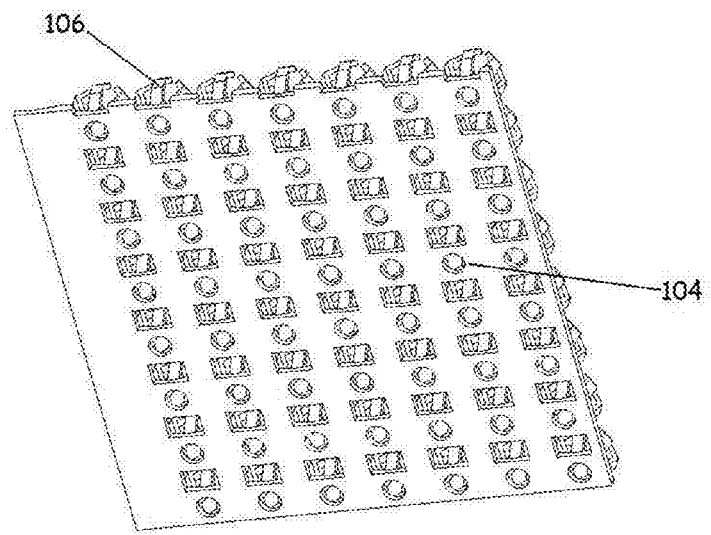
FIG. 1C shows a close up view of the Floor mat crimped projections and the holes in the bottom surface of the Floor mat in accordance with the First Embodiment.
Figure 1D:
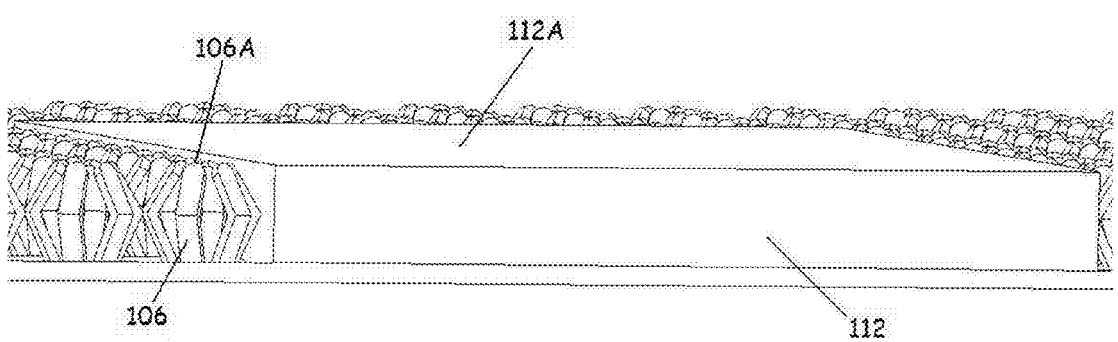
FIG. 1D shows a cross section of heel pad 112 set within floor mat pad 106 with the top surface of heel pad 112A flush with top surface of floor mat pad 106A.
Figure 2A:
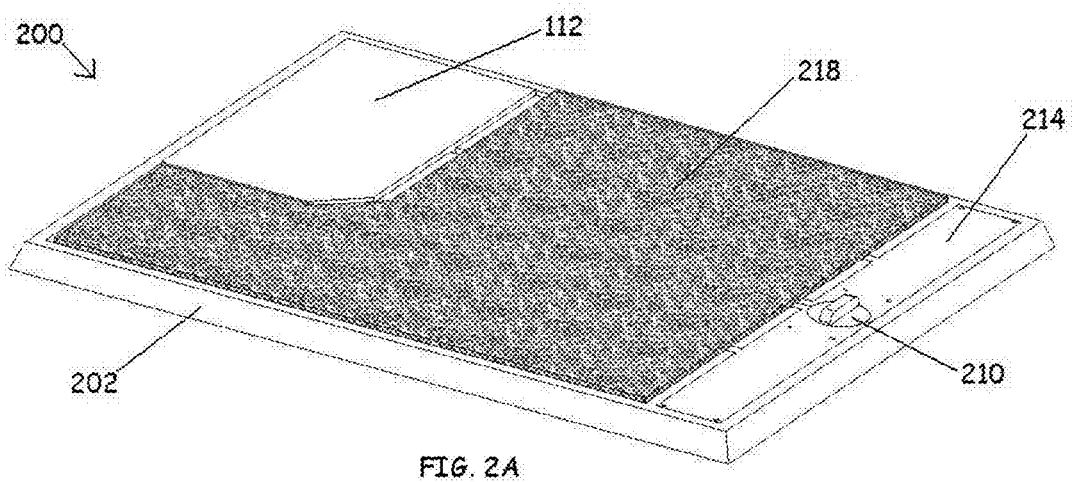
FIG. 2A shows the completed assembly in accordance with another embodiment of the vehicle floor mat, herein called the Second Embodiment.
Figure 2B:
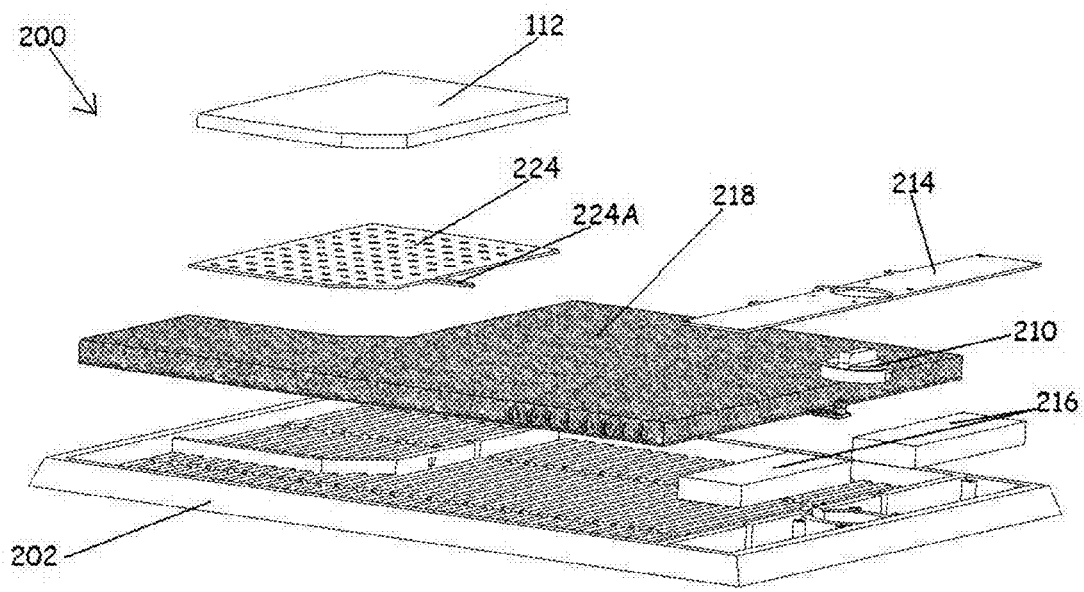
FIG. 2B shows the exploded view of the Second Embodiment assembly; a replaceable heel pad, a heel pad plate, an Enhanced Floor mat with a multi-planar bottom surface and hole pattern herein called Enhanced Floor mat, a waterproof tray, a rotatable cam, a cover plate and sponges.
Figure 3A:
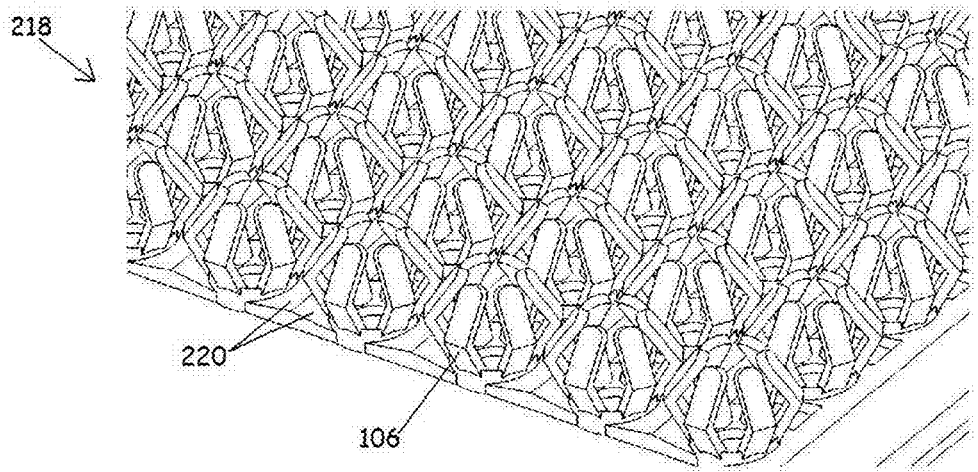
FIGS. 3A and 3B show various views of the Enhanced Floor mat with multi-planar bottom surface, hole pattern, crimped blade like projections, and cam follower, in accordance with the Second Embodiment.
Figure 3B:
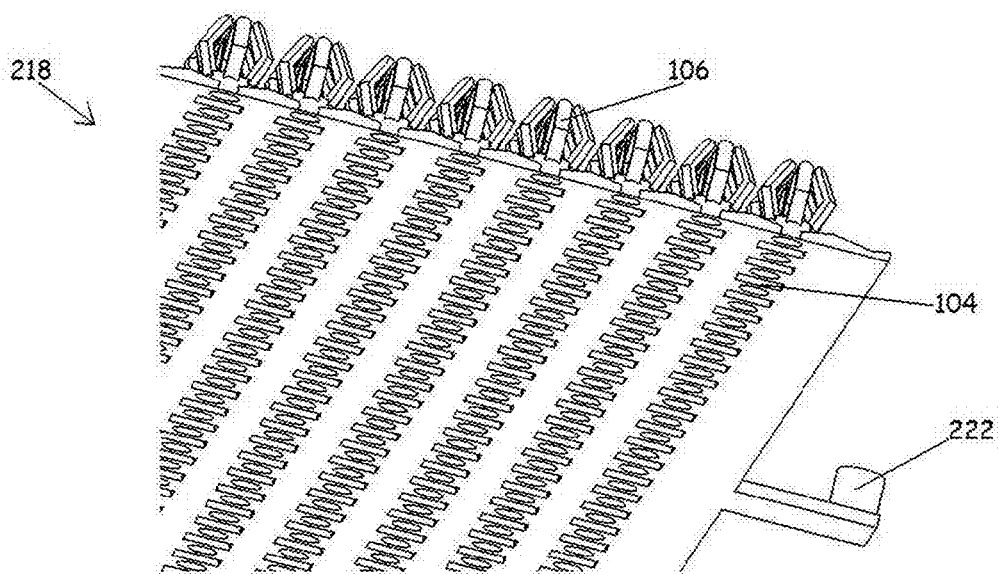

One embodiment of the vehicle floor mat, herein called the First Embodiment 100 is illustrated in FIG. 1A and FIG. 1B (exploded view). This embodiment utilizes a plastic mat with a multitude of crimped projections 106, a predetermined hole pattern 104 herein called Floor mat 102 (FIG. 1C). A waterproof lining 108 is attached to the underside of the Floor mat 108A and a plastic rubber border 110 is attached to the entire Floor mat perimeter 110A (FIG. 1B). The attachment of the waterproof lining 108 and the plastic rubber border 110 would ideally be accomplished through thermal welding however other embodiments may employ other means of attachment such as gluing, chemical welding, sewing or the like. A heel pad 112, in this embodiment made of carpet, is placed into a cutout section of the Floor mat 114 (shown in FIG. 1B) such that the top of the heel pad 112A sits flush with the top of the Floor mat projections 106A as seen in FIG. 1D. Other embodiments may utilize another soft, non abrasive, non skid material for the heel pad such as a foamed flexible plastic that could be easily replaceable. It should be noted, that the overall effect of adding a waterproof sealed bottom with a raised edge border could easily be replaced by using a tray with molded raised edges into which the Floor mat is placed.

Operation

First Embodiment FIGS. 1A, 1B, 1C and 1D

The crimped projections 106 of the Floor mat 102 are ideal for scraping any undesired material off the sole of a shoe and for concealing said undesired material below the visible top surface of the projections 106A. The flush nature of the top surface of the heel pad 112A with the top of the Floor mat projections 106A, enable the occupant of the vehicle to simply push any undesired material off the surface of the heel pad 112A with a simple swipe of his shoe sole edge into the crimped Floor mat projections 106 where it will then drop down to the bottom surface and be concealed as well. The crimped projections 106 also serve as an air flow deflection, reducing the amount of undesirables mixing with the cabin air when the air conditioner, heater, or ventilation fan is turned on. The combination of a waterproof lining 108, welded to the bottom of the Floor mat 108A, and the plastic rubber border 110 welded to the perimeter of the Floor mat 110A, create a waterproof enclosure capable of containing any water caused by snow melt. The crimped projections 106 also serve as a barrier, preventing the heels of the operator's shoe, and the bottom of the operator's pant leg from coming into contact with any water. After months of use in off road and winter conditions, the mat still looks clean and the undesirables are contained and protected without the need to clean.

Second Embodiment

Figure 4:
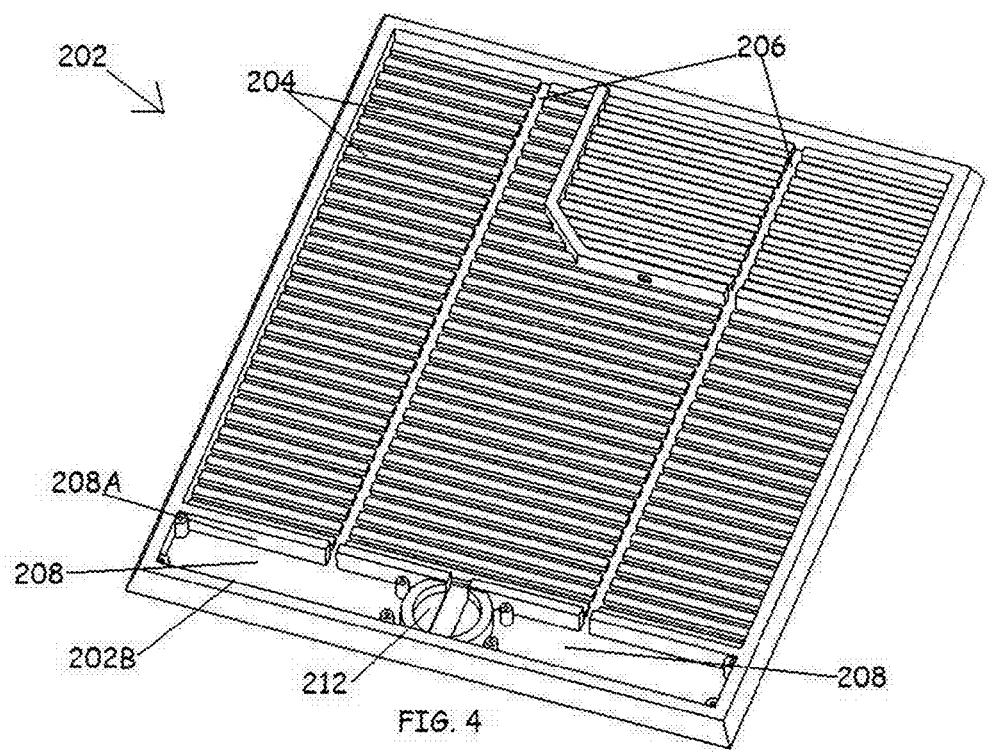
FIG. 4 shows the water proof tray, with a plurality of ribs matching the hole pattern of the Enhanced Floor mat, water drainage slots, a water collection area, and a heel pad section
Figure 5A:
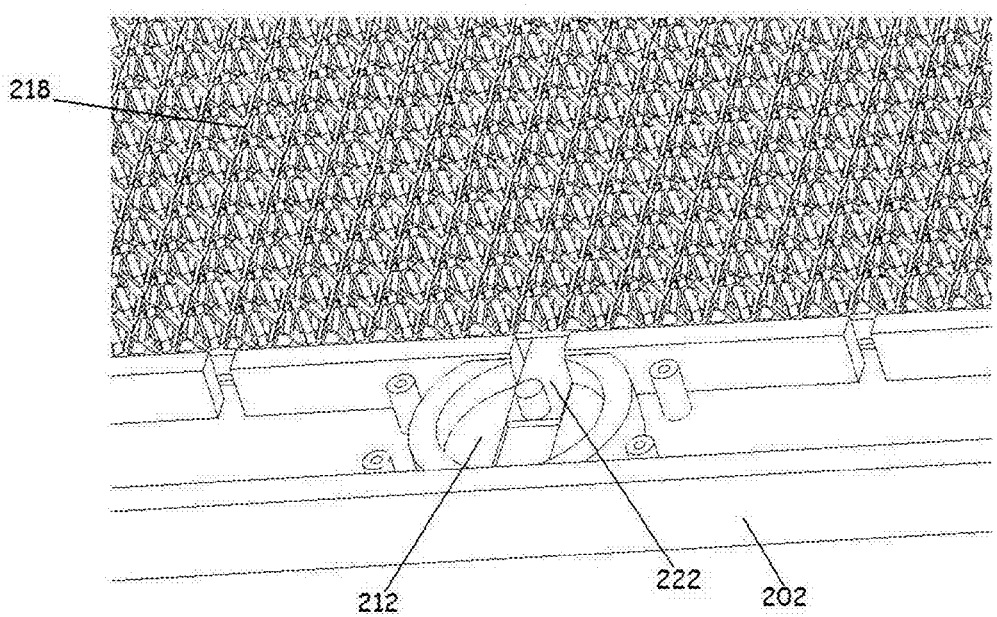
FIG. 5A shows the Enhanced Floor mat inside the waterproof tray without the cam, in accordance with the Second Embodiment.
Figure 5B:
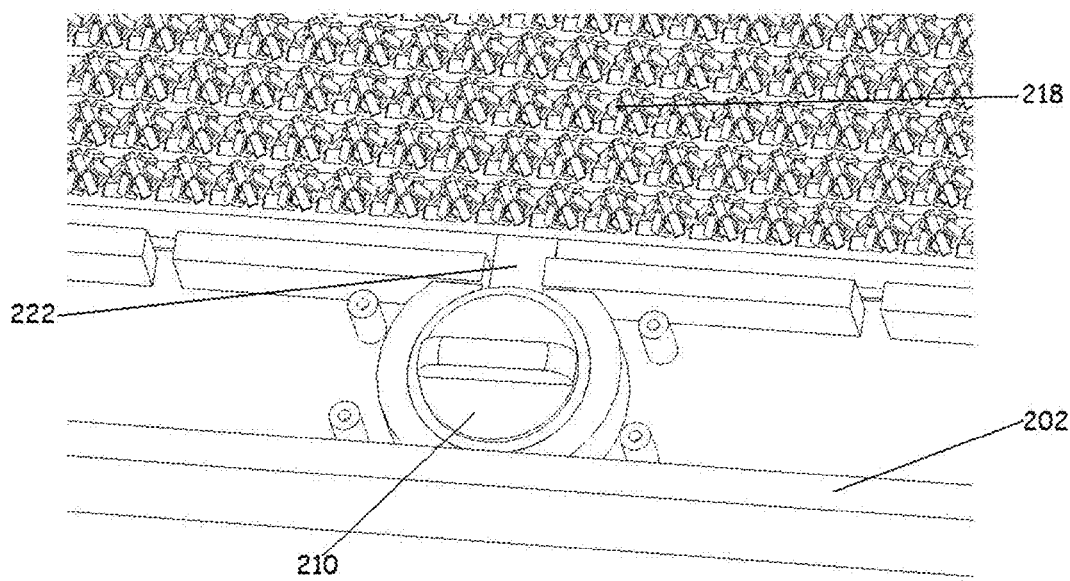
FIG. 5B shows a close up of the cam and the cam follower attached to the Enhanced Floor mat, in accordance with the Second Embodiment.
Figure 5C:
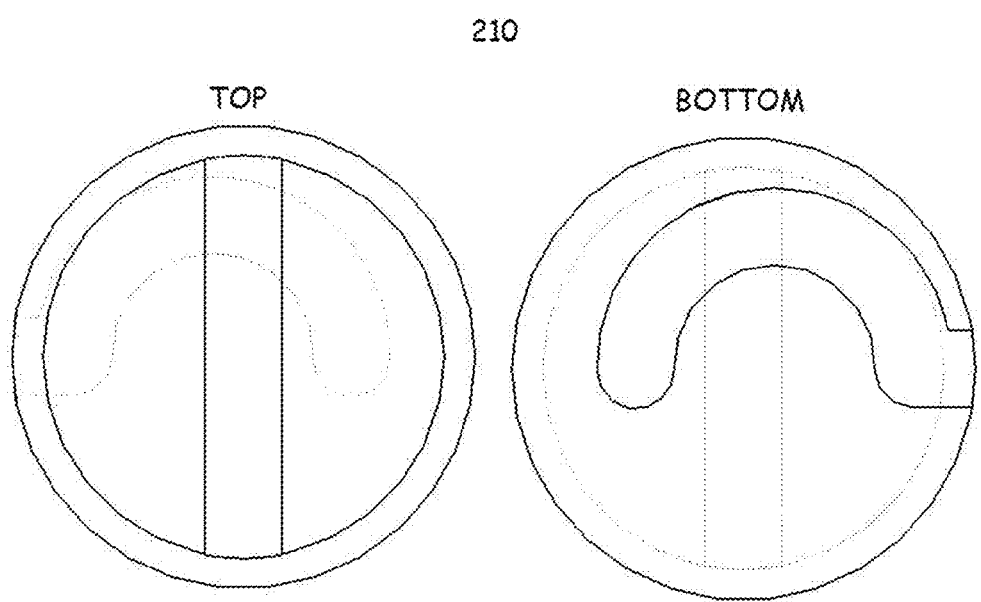
FIG. 5C shows the top and bottom view of the rotatable cam used for shifting the position of the Enhanced Floor mat.

Another embodiment of the vehicle floor mat, herein called the Second Embodiment 200 is illustrated in FIGS. 2A through 8B. This embodiment utilizes the following components (FIG. 2A and exploded view FIG. 2B): a heel pad 112, which could be replaceable, a heel pad plate 224 with locking lever 224A, a water proof tray with raised edges 202, a cover plate 214, a sponge 216, and enhanced Floor mat 218 with a multi-planar bottom surface 220, crimped projections 106, and a predetermined hole pattern 104, herein called Enhanced Floor mat 218. FIGS. 3A and 3B show various views of the Enhanced Floor mat 218, with the multi-planar bottom surface 220, the predetermined hole pattern 104, the crimped blade like projections 106, and a cam follower 222. As shown in FIG. 4, the waterproof tray 202 contains a plurality of ribs 204, water drainages slots 206, a cam compartment 212, and a water collection area 208. The water collection area 208 is contained by the inside perimeter 202B of the tray 202 and a rib 208A. The Enhanced Floor mat 218 is placed inside a waterproof tray 202 as shown in FIG. 5A. A cam 210 is placed inside the waterproof tray cam compartment 212 where it is connected to said cam follower 222 as shown in FIG. 5B. FIG. 5C shows the top and bottom views of the Cam 210. Illustrated in FIG. 6A, the waterproof tray 202 has a plurality of ribs 204 that match the predetermined hole pattern of the Enhanced Floor mat 218. The Enhanced Floor mat 218 rests on the top surface 204A of the plurality of ribs 204. As shown in FIG. 6A, when the cam 210 is in the open position 210A, the Enhanced Floor mat 218 is shifted into a position such that the predetermined hole pattern 104 rests in between the plurality of ribs 204 of the waterproof tray 202. As shown in FIG. 5B, when the cam 210 is in the closed position 210B, the Enhanced Floor mat 218 is shifted into a position such that the predetermined hole pattern 104 rests on top of the plurality of ribs 204 of the waterproof tray 202. Illustrated in FIG. 7A (exploded view) and 7B, is the assembly of the cover plate 214, the sponge 216, and the cam 210. The sponge 216 is placed in the water collection area 208, and the cam 210 is placed in the cam compartment 212. The cover plate 214 is then placed on top of the cam 210 and the sponge 216 and with screws is attached using the provided screw holes 214A on the cover plate 214 and the screw posts 214B inside the waterproof tray 202. In other embodiments of the vehicle floor mat, the sponge 216 may be attached to the cover plate 214 or may not be used altogether. In other embodiments of the vehicle floor mat the cover plate 214 may be attached to the tray using other attachment methods aside from screws such as rivets, snap fittings, glue or chemical or thermal welding. FIG. 8A shows the replaceable heel pad 112 and heel pad plate 224 with locking lever 224A. In this embodiment the replaceable heel pad 112 and heel pad plate 224 will be attached using glue. Other embodiments may use another means of attachment such as sewing or staples or the like. Other embodiments might not utilize a heel pad plate 224 at all and would simply use a replaceable heel pad 112. The replaceable heel pad 112 and heel pad plate 224 are contained in the heel pad section 226 of the waterproof tray 202. FIG. 5B shows a section view illustrating the heel pad 112 and heel pad plate 224 with locking lever 224A, locking into the heel pad section 226 of the waterproof tray 202. As in the first embodiment, the top surface 112A of the heel pad 112 sits flush with the top surface 106A of the Enhanced Floor mat 218.

Operation

Second Embodiment FIGS. 2A Through 7B

Figure 6A:
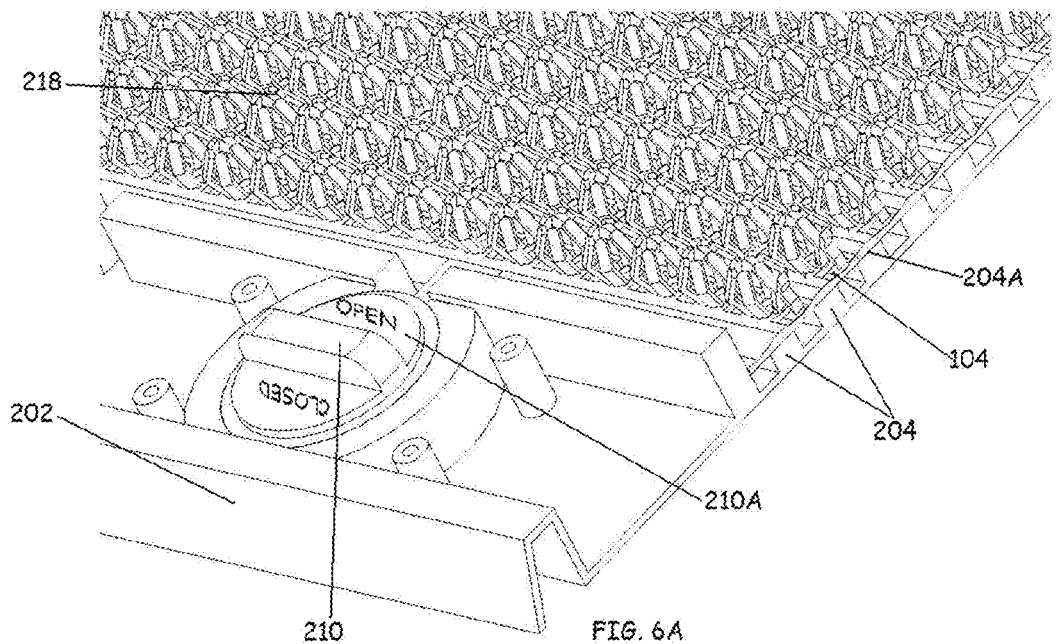
FIG. 6B shows the Enhanced Floor mat inside the waterproof tray with the cam set in the closed position, in accordance with the Second Embodiment.
Figure 6B:
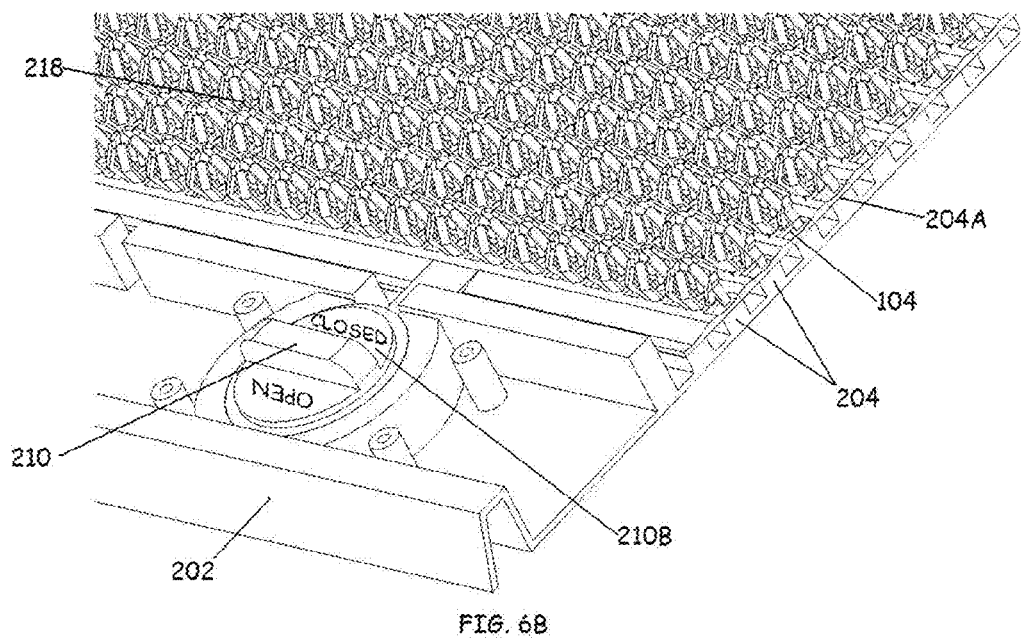
Figure 7A:
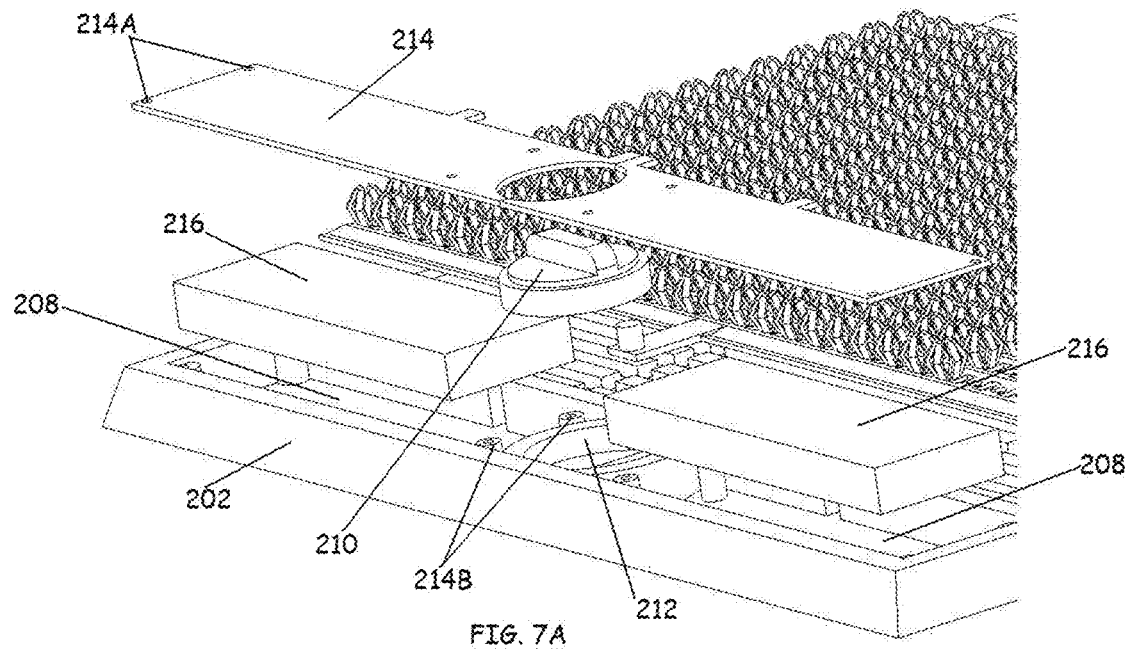
FIG. 7A shows an exploded view of the cover plate, sponge, and cam assembly, in accordance with the Second Embodiment.
Figure 7B:
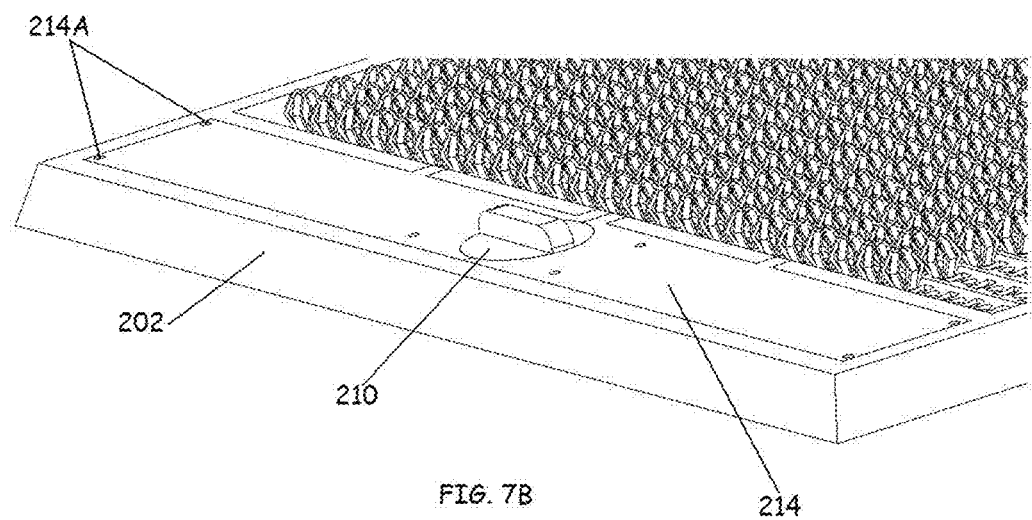
FIG. 7B shows a close up view of the cover plate, sponge, and cam assembly, in accordance with the Second Embodiment.
Figure 8A:
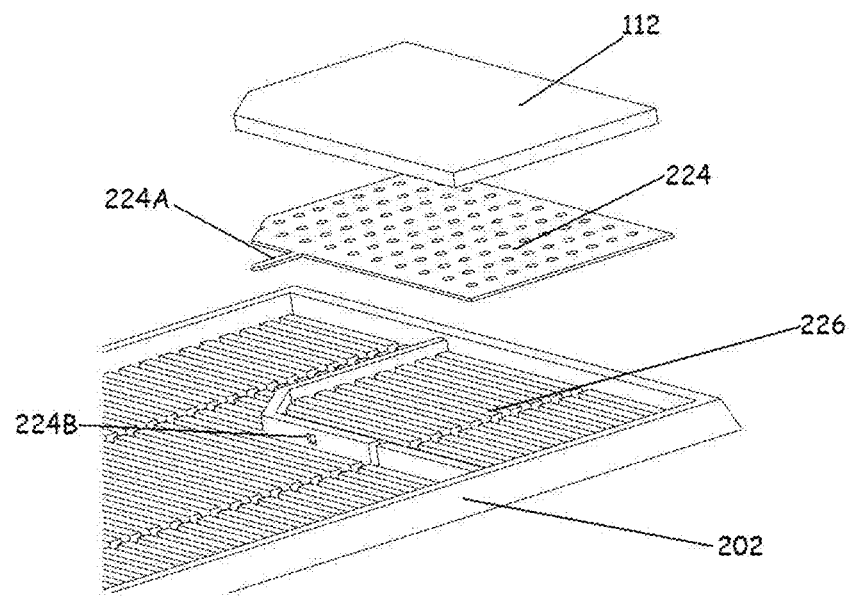
FIG. 8A shows the replaceable heel pad and heel pad plate with a locking lever, in accordance with the Second Embodiment.
Figure 8B:
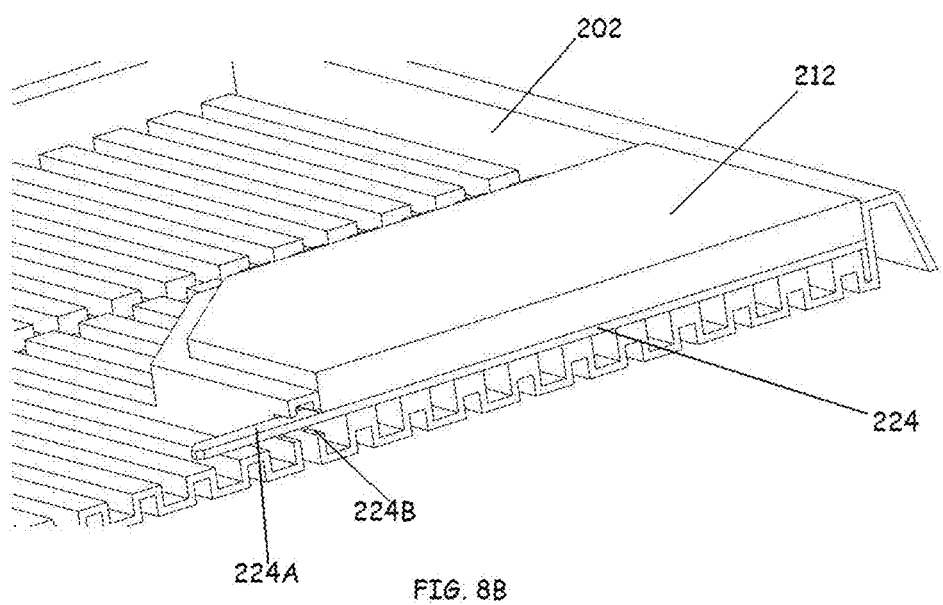
FIG. 8B shows a close up view of the heel pad and heel pad plate locking into the waterproof tray, in accordance with the Second Embodiment.

The Second Embodiment 200 of the vehicle floor mat incorporates the majority of operations and benefits described in the First Embodiment 100. The differences and additional benefits are explained as follows. The undesirable material is scraped off the soles of the operator's shoes, by the crimped blade like projections 106 of the Enhanced Floor mat 218. The material then falls to the bottom multi-planar surface 220 and then through the predetermined hole pattern 104 of the Enhanced Floor mat 218 and then into the waterproof tray 202. The multi-planar bottom surface 220 is designed such that each plane of the surface slopes towards the predetermined hole pattern 104, and there are no horizontal surfaces for the undesired material to collect. When exposed to the vibrations of use, the undesirable material is then directed to the predetermined hole pattern 104 where it will then fall through and into said waterproof tray 202. It should be noted, the blade like projections 106 of the Enhanced Floor mat 218, as best shown in FIG. 1C, are formed from circular tufts of blades that have holes 104 in the center of the tufts. The undesirables that fail through this area fall straight through, as the blades 106 also have no horizontal areas. Either attached to, or molded as part of the Enhanced Floor mat 218 is a cam follower 222. The cam 210 is attached to the cam follower 222 and held in place by the cover plate 214. When rotated, the cam 210, shifts the Enhanced Floor mat 218 position inside the waterproof tray 202. When the cam 210 is rotated to the open position 210A, the predetermined hole pattern 104, of the Enhanced Floor mat 218, rests in between the plurality of ribs 204 of the waterproof tray 202 (FIG. 6A). The undesirable material that falls through the predetermined hole pattern 104, of the Enhanced Floor mat 218, then falls in between the plurality of ribs 204, and onto the bottom surface 202A of the waterproof tray 202. When the cam 210 is rotated to the sealed position 210B, the predetermined hole pattern 104, of the Enhanced Floor mat 218, rests on the top surface 204A of the plurality of ribs 204 (FIG. 6B). This traps any undesirable material that has previously fallen to the bottom surface 202A of the waterproof tray 202, and prevents said undesirable material from mixing with the cabin air, and provides more space and better concealment for the undesirables. This feature is especially important for those who suffer allergies due to dust, pollen, spores, and other similar matter. The waterproof tray 202 contains water drainage slots 206 which direct any water that has accumulated in said tray 202, to a water collection area 208. A sponge 216 is located in the water collection area 208 that will absorb any water and facilitate water removal when required. (FIG. 7A). The cover plate 214 covers the water collection area 208 and provides a means to secure the cam. The replaceable heel pad 112 and heel pad plate 224 with locking lever 224A has the ability to lock into the heel pad section 226 of the waterproof tray 202, through the locking channel 224B as shown in FIG. 8B. This prevents the possibility of the heel pad accidently shifting out of position during operation, causing a potentially dangerous situation, while at the same time holding down the top section of Enhanced Floor mat 218.

Other Embodiments

Figure 9:
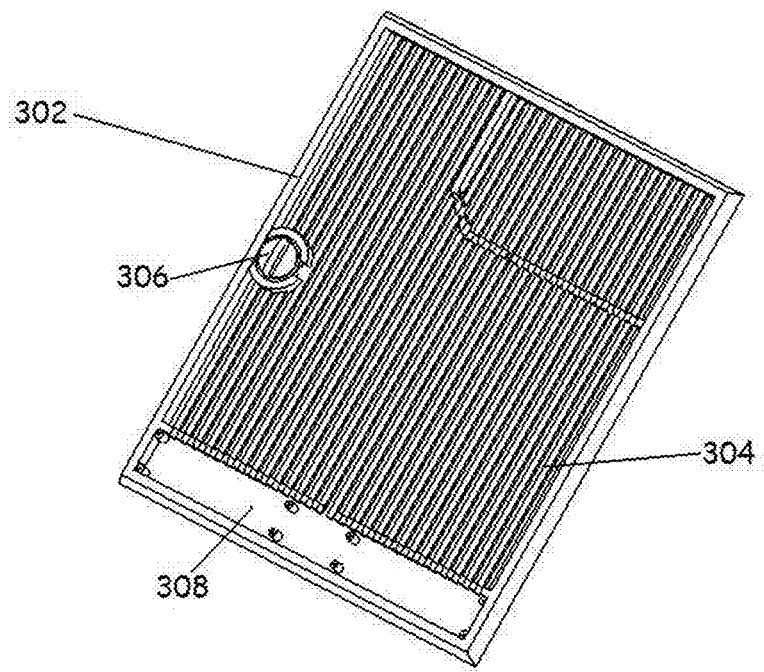
FIG. 9 shows a waterproof tray with vertical ribs, in accordance with another embodiment

Other embodiments of the vehicle floor mat, having similar features and benefits are possible as well. For example, one such embodiment may utilize a waterproof tray 302 having vertical ribs 304 instead of horizontal ribs and the Enhanced Floor mat 218 would be shifted horizontally instead of vertically using a cam 306 mounted on the side of the tray (FIG. 9). This would allow all the dirt and debris to easily flow straight to the water collection area 308.

Figure 10A:
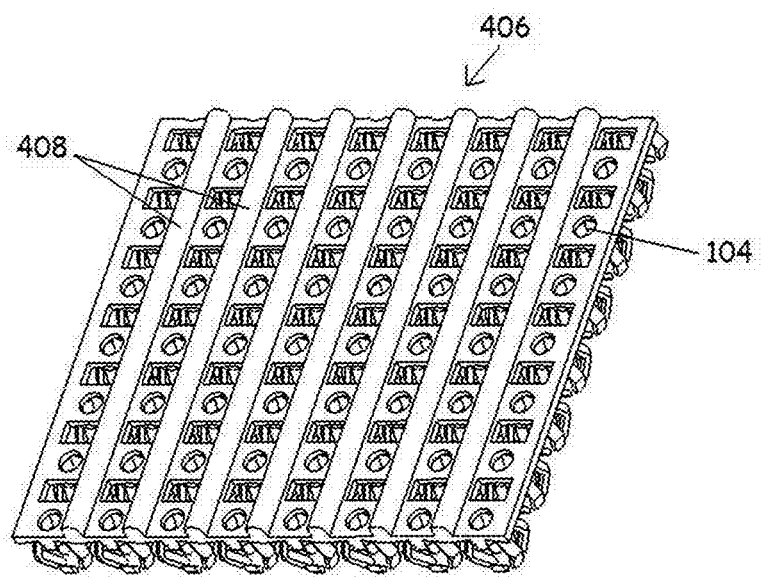
FIG. 10A shows an Enhanced Floor mat with ribs molded to the underside surface, in accordance with another embodiment
Figure 10B:
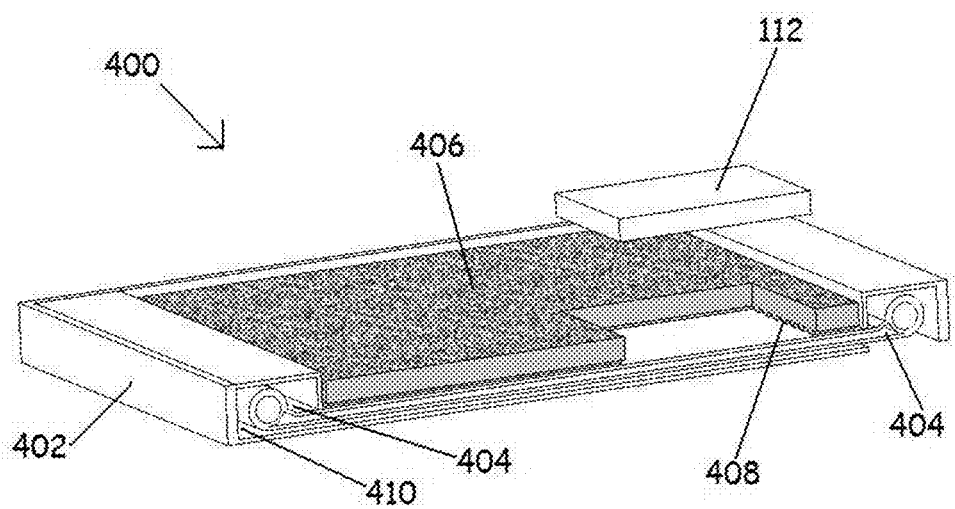
FIG. 10B shows a section view, in accordance with another embodiment of the vehicle floor mat, a water proof tray, the Enhanced Floor mat with a hole pattern and ribs on the underside, a replaceable heel pad, and a moveable plastic sheet.

Another embodiment 400 might utilize a waterproof tray without any ribs at all 402. Instead ribs 408 might be molded onto the underside of the Enhanced Floor mat 406 (FIG. 10A), which would sit on top of a moveable plastic sheet 404, located inside the waterproof tray 402 (FIG. 10B). In this embodiment, dirt and debris (undesirables) would fall through the predetermined hole pattern of the further Enhanced Floor mat 406 with ribs molded to the underside 408, and land on the moveable plastic sheet 404. The sheet 404 can then be rolled, or pulled, carrying the fallen dirt and debris and depositing it into the water collection area 410.

Figure 11A:
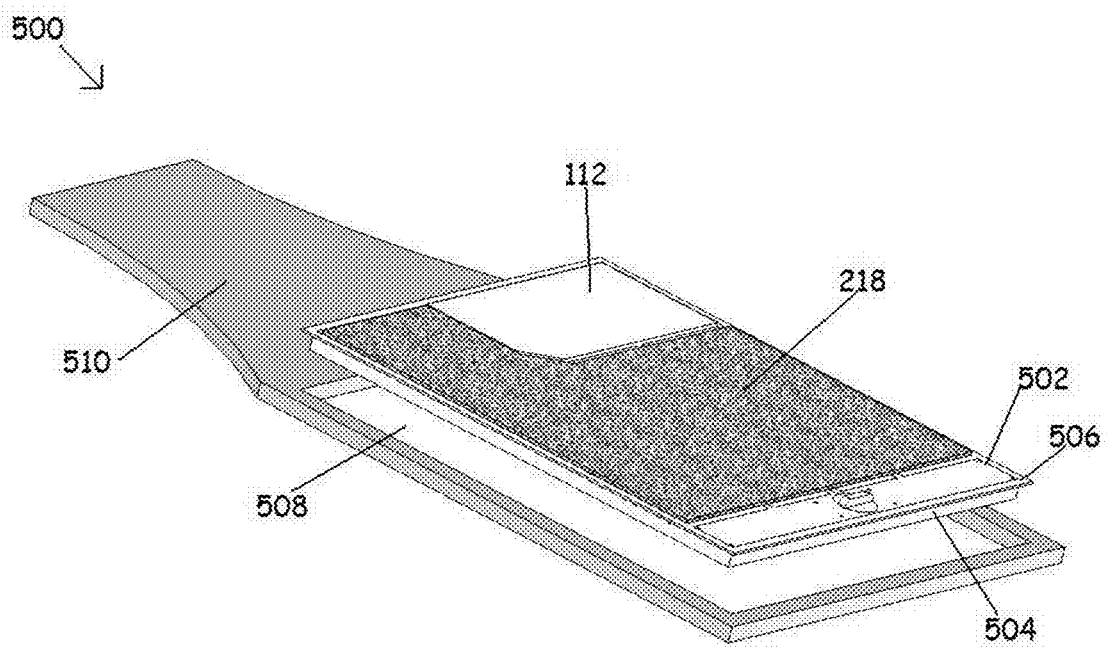
FIG. 11A shows another embodiment herein called the OEM embodiment utilizing a waterproof tray designed to fit into a recess, an Enhanced Floor mat with carpeted heel pad. This embodiment allows for a standard sized unit that can be installed in either the OEM carpet, the OEM aftermarket floor mat, or any one of the custom aftermarket floor mat mats available, whether made of plastic or carpeted material.
Figure 11B:
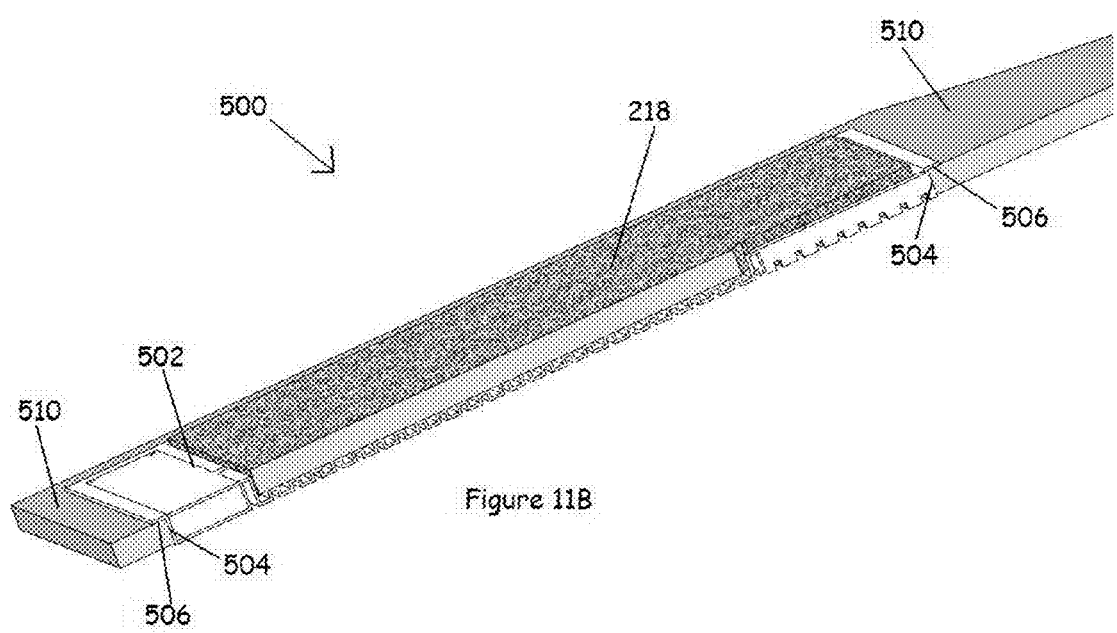
FIG. 11B shows the OEM embodiment sitting inside the recess cut out of an aftermarket carpet floor mat

Another embodiment herein called the OEM Embodiment 500, would utilize all or some of the above features. An OEM waterproof tray 502, with similar features to the Second Embodiment tray 202, but shaped with substantially vertical edges 504 and preferably with a lip 506 on the top surface, along with the Enhanced Floor Mat 218 and heat pad 112, would be inserted into a recess cut 508 out of the original OEM car mat 510. The carpeting that is cut out could be then be cut into the shape of the Floor mat 218 and the heel pad insert 112. The heel pad carpet would be lined with a plastic backing similar to the heel pad backing 224 and the Floor mat shaped cut out would be lined with a similar plastic backing but in the shape of the Floor mat 218 together with cam follower 222. FIG. 11A shows the cutout 508 cut out of an aftermarket floor mat shape, but the same cutout could be made in the original carpet as installed in a new car. In the former case, the aftermarket custom shape mat could be plastic or carpeting, and if it is plastic, the carpet needed for the carpeted insert would preferably be the same as that chosen for the heel pad. This embodiment would provide a flush installation in the car with the possibility of using either the Floor mat insert when conditions demanded it, or the carpeted mat insert when a more formal appearance is desired. It should be noted that the use of well secured custom shapes is of particular commercial importance now as a result of massive re calls by some car manufacturers and the resultant media attention, all as a result of several floor mat mats jamming under the accelerator pedal. Customized floor mat mats have the car shape of that particular model and the securement provisions designed to fit that model. This embodiment allows for a standard Floor mat unit, with its resultant cost savings to be applied in a market where customizing the mat is of the most importance. It further provides an all season, all weather floor mat system that one can change over as required, from Floor mat insert to fully carpeted.

It should be noted that the same combinations of mat and tray can be set into any floor mating material to provide the advantages of such a combination in a flush with floor mating embodiment.

Figure 12:
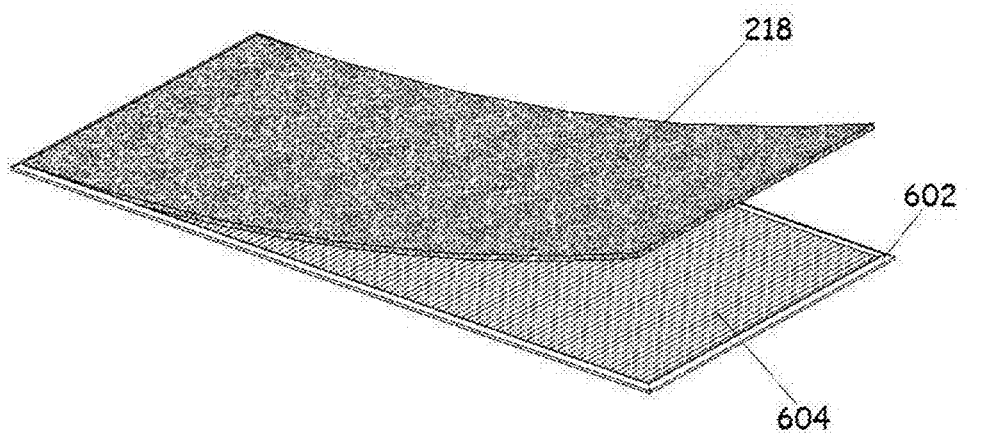
FIG. 12 shows an entrance mat made from Enhanced Floor mat placed inside a waterproof tray in accordance with another embodiment

Entrance Mat Embodiment FIG. 12

The use of the improved floor mat in combination with a tray provides a means to hold, conceal, and seal large quantities of debris. The use is not limited to vehicle mats. In large entrance mats, especially those used in office building entrances, this feature would have significant benefits. The basic floor mat 102 as described herein provides the best scraping mat available and has been very successfully marketed as such for many years by the manufacturers of the product (Solutia). Due to its very nature, it is very difficult to vacuum since the vacuum hose can never be brought dose to the bottom. In ordinary household mats, this is overcome by merely turning the mat upside down. For large entrance mats in commercial applications, this is not easily done, as the size and weight of the mat prohibit easy lifting. The improved floor mat 218 when used in combination with a waterproof tray 602, having ribs 604 similar to those mentioned in the vehicle floor mat embodiment 200, seals in debris making regular cleaning unnecessary. When cleaning is finally required, the light weight floor mat 218 could be easily removed and the waterproof tray 502, which would normally be made of a heavy rubber composite with wide sloping edges and a depression to accommodate the mat could easily be vacuumed.

Those of skill in the art will recognize certain modifications, permutations, additions and sub-combinations thereof of parts noted herein. While a device or an accompanying method have been described for what are presently considered the exemplary embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

I claim:

1. A floor mat system comprising:
a floor mat having a multitude of blades or rods extending from a bottom surface to a top surface, the blades or rods being sufficiently strong to at least partially support a user's weight, the blades or rods arranged in a predetermined pattern and having spacing sufficient to scrape particulate matter from the user's shoe and to allow particulate matter to fall to the bottom surface to be concealed by the blades or rods and further prevented from contaminating the air when exposed to an air flow;
a heel pad; and
a waterproof enclosure formed by a waterproof lining on an underside of the floor mat and a raised border around the perimeter of the floor mat or the waterproof enclosure being a separate waterproof tray with a raised border for placement of the floor mat, the waterproof enclosure configured to contain particulate matter and any water from the floor mat in an area of reduced exposure and further prevented from contaminating the air when exposed to an air flow.

2. The floor mat system of claim 1, further including a carpeted insert with the same shape and substantially the same depth as the floor mat, and interchangeable with it,
whereby, the user may choose either a fully carpeted floor mat rather than the floor mat with extruded or molded blades.

3. The floor mat system of claim 1, wherein the floor mat comprises holes in a predetermined pattern to provide additional space for particulate matter or water to accumulate further away from the top surface.

4. The floor mat system of claim 3, wherein the bottom surface of the floor mat is multi-planar wherein substantially all of said bottom surface slopes downward towards said holes whereby any debris or water will be directed into said holes.

5. The floor mat system of claim 3, wherein the waterproof enclosure is formed by a separate waterproof tray having slots or depressions in the bottom thereof, the slots or depressions corresponding to the predetermined pattern of holes to provide further additional space for particulate matter or water to accumulate further away from the top surface of the floor mat.

6. The floor mat system of claim 5, further comprising means for moving the floor mat a distance equal to at least a size of the holes to seal particulate matter or water under the floor mat within the slots or depressions and away from the air flow.

7. The floor mat system of claim 3, wherein the bottom of the bottom surface of the floor mat comprises projections or ribs whereby more space is provided for debris and water to collect.

8. A floor mat system comprising:
a floor mat having a multitude of blades or rods extending from a bottom surface to a top surface, the blades or rods being sufficiently strong to at least partially support a user's weight, the blades or rods arranged in a predetermined pattern and having spacing sufficient to scrape particulate matter from the user's shoe and to allow particulate matter to fall to the bottom surface to be concealed by the blades or rods and further prevented from contaminating the air when exposed to an air flow,
a waterproof enclosure formed by a waterproof lining on an underside of the floor mat and a raised border around the perimeter of the floor mat or the waterproof enclosure being a separate waterproof tray with a raised border for placement of the floor mat, the waterproof enclosure configured to contain particulate matter and any water from the floor mat in an area of reduced exposure,
wherein the bottom surface of the floor mat comprises holes in a predetermined pattern to provide additional space for particulate matter or water to accumulate further away from the top surface.

9. The floor mat system of claim 8, wherein the bottom surface of the floor mat is multi-planar wherein substantially all of said bottom surface slopes downward towards said holes whereby any debris or water will be directed into said holes.

10. The floor mat system of claim 8, wherein the waterproof enclosure is formed by a separate waterproof tray having slots or depressions in the bottom thereof, the slots or depressions corresponding to the predetermined pattern of holes to provide further additional space for particulate matter or water to accumulate further away from the top surface.

11. The floor mat system of claim 10, further comprising means for moving the floor mat a distance equal to at least a size of the holes to seal particulate matter or water under the floor mat within the slots or depressions and away from any exposure.

12. The floor mat system of claim 8, wherein the bottom of the bottom surface of the floor mat comprises projections or ribs whereby more space is provided for debris and water to collect.

13. A floor mat system comprising:
a floor mat having a multi-planar top surface having holes in a predetermined pattern, wherein substantially all of said top surface slopes downward towards said holes whereby any debris or water will be directed into said holes, and
a waterproof enclosure formed by a waterproof lining on an underside of the floor mat and a raised border around the perimeter of the floor mat or the waterproof enclosure being a separate waterproof tray with a raised border for placement of the floor mat, the waterproof enclosure configured to contain particulate matter or water in an area of reduced exposure.

14. The floor mat system of claim 13, wherein the waterproof enclosure is formed by a separate waterproof tray having slots or depressions in the bottom thereof, the slots or depressions corresponding to the predetermined pattern of holes to provide additional space for particulate matter or water to accumulate.

15. The floor mat system of claim 14, further comprising means for moving the floor mat a distance equal to at least a size of the holes to seal particulate matter or water under the floor mat within the slots or depressions and away from the air flow.

16. The floor mat system of claim 13, wherein the bottom of the bottom surface of the floor mat comprises projections or ribs whereby more space is provided for debris and water to collect.

* * * * *